(12) United States Patent
Li et al.

(10) Patent No.: US 10,628,511 B2
(45) Date of Patent: Apr. 21, 2020

(54) MACHINE LEARNING SYSTEM AND METHOD OF CLASSIFYING AN APPLICATION LINK AS BROKEN OR WORKING

(71) Applicant: Google LLC, Mountain View, CA (US)

(72) Inventors: Xin Li, Beijing (CN); Fang Yang, Mountian View, CA (US)

(73) Assignee: Google LLC, Mountain View, CA (US)

( * ) Notice: Subject to any disclaimer, the term of this patent is extended or adjusted under 35 U.S.C. 154(b) by 446 days.

(21) Appl. No.: 15/318,229

(22) PCT Filed: Oct. 17, 2016

(86) PCT No.: PCT/CN2016/102265
§ 371 (c)(1),
(2) Date: Dec. 12, 2016

(87) PCT Pub. No.: WO2018/072060
PCT Pub. Date: Apr. 26, 2018

(65) Prior Publication Data
US 2019/0197077 A1  Jun. 27, 2019

(51) Int. Cl.
*H03K 5/19* (2006.01)
*H04L 29/14* (2006.01)
(Continued)

(52) U.S. Cl.
CPC ...... *G06F 16/9566* (2019.01); *G06F 16/9558* (2019.01); *G06N 20/00* (2019.01);
(Continued)

(58) Field of Classification Search
CPC . G06F 16/9566; G06F 16/9558; G06N 20/00; H04L 67/36
(Continued)

(56) References Cited

U.S. PATENT DOCUMENTS 7,610,267 B2  10/2009  Kulkarni et al.
8,326,941 B2  12/2012  Aviles Sanchez et al.
(Continued)

FOREIGN PATENT DOCUMENTS

CN  103605992  2/2014
CN  105207797  12/2015
(Continued)

OTHER PUBLICATIONS

EP Extended European Search Report issued in European Application No. 16904846.9, dated Feb. 19, 2019, 9 pages.
(Continued)

*Primary Examiner* — Cesar B Paula
*Assistant Examiner* — Luu-Phuong T Nguyen
(74) *Attorney, Agent, or Firm* — Fish & Richardson P.C.

(57) ABSTRACT

Methods, systems, and apparatus, including computer programs encoded on a computer storage medium, for identifying broken network connections. In one aspect, a system includes front-end server(s) that receive data specifying, for multiple different user interactions with one or more application links that link to a given application, presentation durations specifying how long application content linked to by the application link was presented following the multiple different user interactions with the application link(s). Back-end server(s) that communicate with the front end server(s) can classify each application link as broken or working based on application of a machine learning model to the presentation durations for the application link. The machine learning model can be generated using labeled training data. The back-end server(s) can generate and output an alert identifying an application link as a broken link based on the application link being classified as broken by the machine learning model.

18 Claims, 4 Drawing Sheets

(51) Int. Cl.
*G06F 16/955* (2019.01)
*H04L 29/08* (2006.01)
*H04L 12/24* (2006.01)
*G06N 20/00* (2019.01)
*G06F 11/34* (2006.01)
*G06F 11/30* (2006.01)

(52) U.S. Cl.
CPC .............. *H04L 41/16* (2013.01); *H04L 67/22* (2013.01); *H04L 67/36* (2013.01); *H04L 69/329* (2013.01); *G06F 11/30* (2013.01); *G06F 11/3051* (2013.01); *G06F 11/3055* (2013.01); *G06F 11/3058* (2013.01); *G06F 11/3065* (2013.01); *G06F 11/3089* (2013.01); *G06F 11/34* (2013.01); *G06F 11/3438* (2013.01); *G06F 11/3452* (2013.01); *H04L 67/02* (2013.01)

(58) Field of Classification Search
USPC .......................................................... 715/205
See application file for complete search history.

(56) References Cited

U.S. PATENT DOCUMENTS

| | | | | |
|---|---|---|---|---|
| 2004/0158429 | A1* | 8/2004 | Bary ..................... | G06F 16/958 702/183 |
| 2005/0071478 | A1* | 3/2005 | Bates .................... | G06F 16/958 709/228 |
| 2005/0091216 | A1* | 4/2005 | Kranz ................. | G06F 16/9566 |
| 2006/0048049 | A1* | 3/2006 | Sholl ................... | G06F 17/2235 715/207 |
| 2006/0294052 | A1* | 12/2006 | Kulkarni ............... | G06F 16/951 |
| 2008/0052629 | A1 | 2/2008 | Phillips et al. | |
| 2008/0133500 | A1* | 6/2008 | Edwards ............... | G06F 16/958 |
| 2008/0222068 | A1* | 9/2008 | Bahl ....................... | G06N 5/043 706/46 |
| 2010/0287174 | A1* | 11/2010 | Yang ..................... | G06F 16/951 707/759 |
| 2011/0153631 | A1 | 6/2011 | Kondasani | |
| 2011/0292949 | A1* | 12/2011 | Hayashi ................. | H04L 45/00 370/419 |
| 2012/0079060 | A1 | 3/2012 | Vijayakumar et al. | |
| 2012/0259832 | A1 | 10/2012 | Peterson et al. | |
| 2014/0273923 | A1 | 9/2014 | Papakostas | |
| 2016/0014215 | A1* | 1/2016 | Oran .................... | G06F 16/9566 709/219 |
| 2016/0085732 | A1* | 3/2016 | Boehler ............. | G06F 17/2235 715/207 |
| 2016/0212031 | A1* | 7/2016 | Jain ..................... | H04L 43/0876 |

FOREIGN PATENT DOCUMENTS

| | | |
|---|---|---|
| JP | 2005-301502 | 10/2005 |
| JP | 2007-272695 | 10/2007 |
| JP | 2013-546041 | 12/2013 |
| JP | 2015-191439 | 11/2015 |
| RU | 2585971 | 6/2016 |
| WO | 2016/115319 | 7/2016 |
| WO | 2016112209 | 7/2016 |

OTHER PUBLICATIONS

KR Office Action issued in Korean Application No. 10-2017-7036578, dated Jun. 18, 2018, 2 pages. (English Translation).
International Search Report and Written Opinion in International Application No. PCT/CN2016/102265, dated Apr. 12, 2017, 11 pages.
JP Notice of Grounds of Rejection in Japanese Application No. 2018-504982, dated Aug. 29, 2019, 4 pages (with English translation).
Russian Decision to Grant in Russian Application No. 2017143960, dated Dec. 26, 2019, 26 pages (with English translation).

* cited by examiner

MACHINE LEARNING SYSTEM AND METHOD OF CLASSIFYING AN APPLICATION LINK AS BROKEN OR WORKING

CROSS-REFERENCE TO RELATED APPLICATION

This application is a National Stage Application under 35 U.S.C. § 371 and claims the benefit of International Application No. PCT/CN2016/102265, filed Oct. 17, 2016. The disclosure of the foregoing application is hereby incorporated by reference in its entirety.

BACKGROUND

The Internet facilitates the exchange of information and transactions between users across the globe. This exchange of information enables data providers to provide data to a variety of users. The data can be provided in various ways, including publishing the information on electronic documents (e.g., web pages) and within applications (e.g., mobile apps). For example, an application can include application pages that present information to users.

Links can be used to assist users in navigating to resources that may be of interest to a user. A link can point to an electronic document or to a particular location in an application (e.g., to an application page). However, some links may not properly point to a document or application page. Such links are commonly referred to as broken links. For example, a link may become a broken link if the document or application page to which the link points is moved to a new address or removed from the domain that hosted the document or application page. In addition, an application link may become broken after an application update or in response to a server that hosts application content becoming unavailable.

SUMMARY

This specification describes technologies relating to using machine learning to identify broken network connections (e.g., broken application links) based on how long content was presented after initiating (or completing) the network connections (e.g., in response to user interaction with the broken application links).

In general, one innovative aspect of the subject matter described in this specification can be embodied in a system that includes one or more front-end servers that receive data specifying, for multiple different user interactions with one or more application links that link to a given application, presentation durations specifying how long application content linked to by the application link was presented following the multiple different user interactions with the one or more application links. The system can also include one or more back-end servers that communicate with the one or more front end servers and perform operations including classifying each application link as broken or working based on application of a machine learning model to the presentation durations for the application link. The machine learning model can be generated using labeled training data that includes, for each training application link in a set of training application links, a set of presentation durations for the training application link and a label that specifies whether the training application link is broken or working based on whether a user interaction with the training application link resulted in successful presentation of content pointed to by the training application link. The one or more back-end servers can also perform operations including generating and outputting an alert identifying a given application link as a broken link based on the given application link being classified as broken by the machine learning model. Other embodiments of this aspect include corresponding apparatus, methods, and computer programs, configured to perform the actions of the methods, encoded on computer storage devices.

These and other embodiments can each optionally include one or more of the following features. In some aspects, the machine learning model classifies an application link by assigning each presentation duration for the application link to a duration group of a set of duration groups based on duration. Each duration group can be for a range of durations and include the presentation durations for the application link that are within the range of durations for the duration group. The machine learning model can classify the application link as broken or working based on a pattern defined by a number of presentation durations assigned to each duration group. The pattern defined by the number of presentation durations can include a distribution of the presentation durations.

In some aspects, the operations performed by the system can include identifying a set of application links including the one or more application links that that link to a given application; grouping the application links into a set of application link groups based on characteristics of the application links in the set of application links; and classifying each application link group as having broken or working links based on application of the machine learning model to presentation durations for the application links in the application link group.

In some aspects, each application link includes a string of characters for identifying a particular location within a particular application. The operations performed by system can include identifying one or more application link prefix patterns for a set of applications links that includes the one or more application links based at least on the string of characters of the application links. Each application link prefix pattern can specify a string of characters common to two or more application links. For each application link prefix pattern, the operations performed by the system can include identifying a group of application links that include the string of characters specified by the application link prefix pattern; identifying a set of presentation durations for each application link in the group of application links; applying the machine learning model to the presentation durations for the group of application links; and generating and outputting an alert identifying a given group of application links for a given application link prefix pattern as broken links based on the machine learning model classifying the set of application links as broken.

In some aspects, the operations performed by the system include identifying the one or more application link prefix patterns based on a number of presentation durations available for each application link prefix pattern. In some aspects, the machine learning model includes a linear regression model.

Particular embodiments of the subject matter described in this specification can be implemented so as to realize one or more of the following advantages. As selection of broken links to an application's content can cause the application to crash or function improperly, identifying and removing broken links to the application's content can prevent such crashes and/or improper functioning of the application or device executing the application. Using machine learning to identify bad application links allows for the identification of bad application links that point to application content that cannot be properly crawled by an application or web crawler. User frustration is reduced by reducing the number of bad application links that direct the users' devices to incorrect application content or cause the application executing on the users' devices to crash or function improperly.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
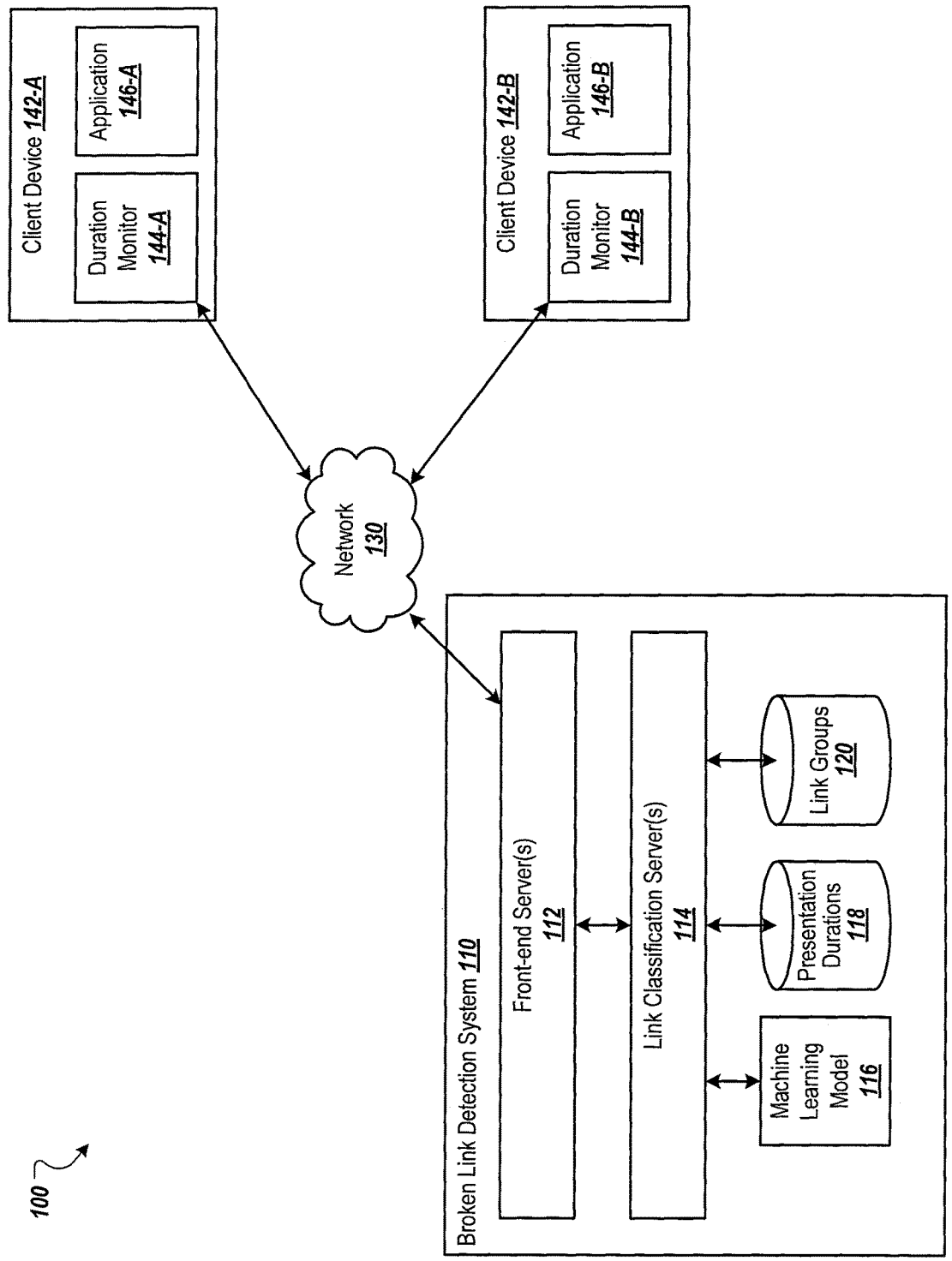
FIG. 1 is an example environment in which a broken link detection system automatically detects broken application links.

Systems and techniques described herein allow for the detection of broken application links, including application links that cannot be tested by selecting the links (e.g., manually or automatically) and determining whether content to which the application links point are obtained. For example, an application crawler that is used to test application links in this way may not have access to application content to which an application link points as the application may require log in information to access the content. In another example, the use of an application crawler to test application links may cause more network timeouts than when a web crawler is used to test web links to web pages, thereby making the use of an application crawler less effective. Using machine learning rather than an application crawler can avoid such network timeouts, and thereby improve techniques for identifying broken application links, for example, by providing more accurate broken link analysis.

A system can train a machine learning model to predict whether an application link is a broken link based on presentation durations for the application link. A presentation duration for an application link specifies how long application content linked to by the application link was presented following a user interaction with the application link. The presentation duration may be measured from a time at which user interaction with the application link occurred to a time at which the application is closed or the application navigates to other content, e.g., in response to user interaction with the application. If the application crashes, the presentation duration may be measured from a time at which user interaction with the application link occurred and a time at which the application crashed.

In some implementations, the machine learning model classifies an application link as broken or working based on distributions of presentation durations for the application link. For example, if the application link has substantially more (e.g., more than a specified number of or percentage of) short presentation durations (e.g., those having less than a threshold duration) than long presentation durations (those having greater than a threshold duration), the application link may have a distribution pattern that suggests that the application link is broken. In another example, if the application link has a natural distribution of presentation durations with few (e.g., less than a threshold) short presentation durations, the application link may have a distribution pattern that suggests that the application link operates correctly and it not broken.

The machine learning model can also predict (e.g., determine) whether groups of application links are broken. The application links can be grouped into application link groups based on the prefix patterns of the application links. Each application link can include a string of characters for identifying a particular location within a particular application, e.g., a particular application page of an application, a particular video of a video application, or a particular restaurant page of a restaurant review application. Each application link prefix pattern can specify a string of characters that is common to multiple application links. For example, the string of characters of a first application link may be "appname:itemcategory1/item1" and the string of characters of a second application link may be "appname: itemcategory1/item2." The application link prefix pattern for these two application links may be "appname:itemcategory/" as this string of characters is common to (e.g., the same in) both application links. As application links that have a matching (e.g., the same or within a specified similarity measure based on the number of matching characters) prefix pattern often become broken at the same time or for the same reason, grouping application links by prefix patterns allows the machine learning model to predict whether the links in the group have become broken without having to run the model on the presentation durations for each application link separately. This grouping can result in quicker classifications using fewer computing resources relative to having to run the model on each of the application links separately. The grouping can also increase the amount of selection duration data used by the machine learning model for a particular classification, resulting in more accurate predictions due to reduced effect of noisy or incorrect data.

FIG. 1 is an example environment 100 in which a broken link detection system 110 automatically detects broken application links. The broken link detection system 110 includes one or more front-end servers 112 and one or more link classification servers 114. The front-end server(s) 112 can receive data specifying presentation durations from client devices 142 (e.g., the client devices 142-A and 142-B) over a network 130. The front-end server(s) 112 can also transmit notifications or alerts to the client devices 142 over the network 130, for example, in response to an application link being classified as a broken link. The network 130 can include a local area network (LAN), a wide area network (WAN), the Internet, a mobile network, or a combination thereof.

Each client device 142 can include one or more applications 146 and a duration monitor 144. For example, the client device 142-A includes an application 146-A and a duration monitor 144-A. Similarly, the client device 142-B includes an application 146-B and a duration monitor 144-B. The applications 146 may include native applications that are developed for a particular platform or a particular type of device.

A user may access content of an application 146 by interacting with (e.g., selecting) an application link that points to (e.g., links to a network location of) the application or to a particular location within the application. An application link can include a string of characters that cause the client device 142 to open the application 146 (if the application 146 is not already open) and navigate to the particular location to which the application link points in response to user interaction with the application link. For example, the string of characters may identify the application 146 and the particular location within the application 146 to which the application link points. The application links can be deep links in the form or a uniform resource identifier (URI) that links to a particular page (or user interface screen) of the application other than a highest level page (e.g., welcome page or sign-in page) of the application.

Application links can be presented on web pages, within applications, on search results pages, and/or on other types of electronic resources. The same application link may be presented on multiple different resources and can be interacted with by multiple different users. As described above, an application link may become broken if the application 146 is updated, the server hosting application content becomes unavailable (e.g., goes offline), or other events that may not be readily apparent to a user. In such cases, user interaction with the application link (on either resource on which the application link is presented) may cause the application to which the application link points to crash or cause the application to present incorrect content. Thus, identifying and removing broken application links from electronic resources can prevent such crashing and incorrect content presentations, thereby improving the user experience with the application.

A broken link is a link that does not properly link to a particular application or to a particular location within an application. For example, a broken application link may link to a location within an application that does not exist. In another example, a broken application link may link to a location within an application that previously existed, but does not currently due to the server that hosts the content at the location being unavailable or the content being moved to a different location, e.g., due to an update to the application.

An application link may also be broken if the application link properly links to incorrect content. For example, an application link may be intended to link to a particular news story but actually links to a different news story. In this example, a user that interacts with the application link may be presented the different news story and may close the application or return to the application or content that includes the link without reading the different news story. By identifying and removing such broken application links can improve the user experience and reduce the number of network requests initiated to retrieve content, resulting in better network performance and reduced demand on network resources.

The duration monitors 144 can monitor the presentation duration of application content. For example, the duration monitors 114 can monitor the presentation duration of content that is presented following user interaction with (e.g., selection of) an application link that points to the application content. The presentation duration may be measured from a time at which user interaction with the application link occurred to a time at which the application is closed or the application navigates to other content, e.g., in response to user interaction with the application. For example, a user may select an application link (e.g., that is presented on a search results page) to a particular location within an application at 12:01 PM and the content at the particular location may be presented to the user via the application. In response to the selection, the duration monitor 144 (or a search system that provided the search results page) may record the time of selection in a log (e.g., a search log). If the user selects a back button or otherwise exits the application, the client device 142 may return to the search results page. The duration monitor 144 (or the search system) may record in the log the time that the client device 142 closed the application or returned to the search results page, e.g., 12:05. In this example, the duration monitor 144 may obtain the two times, e.g., from the log, and determine the presentation duration by subtracting 12:01 from 12:05. Thus, in this example, the presentation duration is 4 minutes. If the application crashes, the presentation duration may be measured from a time at which user interaction with the application link occurred and a time at which the application crashed. For example, the duration monitor 144 may receive a message, e.g., from the application or the operation system of the client device, that specifies the time at which the application crashed.

The duration monitor 144 may monitor and record presentation durations for multiple different application links that receive a user interaction at the client device 142. The duration monitor 144 may also transmit data specifying the presentation durations for each application link to the front-end server(s) 112 of the broken link detection system 110. The front-end server(s) 112 can receive presentation durations from multiple different client devices 142 associated with multiple different users. For example, the front-end server(s) 112 may receive presentation durations from the client device 142-A associated with a first user and from the client device 142-B associated with a second user different from the first user. In this way, selection durations for a given application link may be aggregated over multiple different users.

The front-end server(s) 112 can provide the received presentation durations to the link classification server(s) 114. In turn, the link classification server(s) 114 can store the presentation durations in a presentation durations database 118, e.g., stored on a data storage device. Each presentation duration can be stored with an association to the application link for which the presentation duration was recorded.

Figure 4:
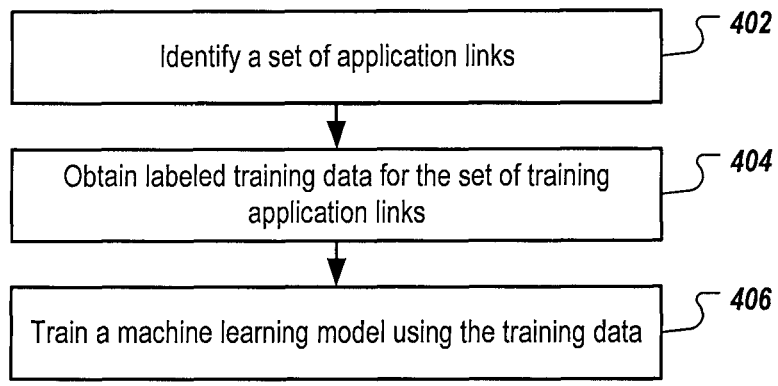
FIG. 4 is a flow chart of an example process for training a machine learning model to predict whether application links are broken links.

The link classification server(s) 114, which may be implemented as one or more back-end servers, can train a machine learning model 116 to predict whether an application link is broken and/or whether application links in a group of applications links are broken. An example technique for training a machine learning model is illustrated in FIG. 4 and described below. The machine learning model 116 can classify an application link as broken or working (e.g., not broken) based on presentation durations for the application link. For example, the link classification server(s) 114 may apply the machine learning model 116 to a set of presentation durations for the application link and classify the application link based on the set of presentation durations. The set of presentation durations used to classify the application link may be those for content presentations that occurred within a particular time period, e.g., during the previous day or week, following user interaction with the application link.

In some implementations, the machine learning model 116 classifies an application link as broken or working based on a distribution of presentation durations for the application link. In this example, the link classification server(s) 114 may have a set of duration groups and each duration group may correspond to a range of durations. For example, the groups may include a first group for durations of 0-3 seconds, a second group for durations of 3-6 seconds, a third group for durations of 6-9 seconds, and so on. The link classification server(s) 114 can identify, for each presentation duration, the range of durations in which the presentation duration falls and assign the presentation duration to the duration group corresponding to that range of durations. For example, the link classification server(s) 114 may assign a presentation duration of 7 seconds to the duration group having the range 6-9 seconds.

Figure 2:
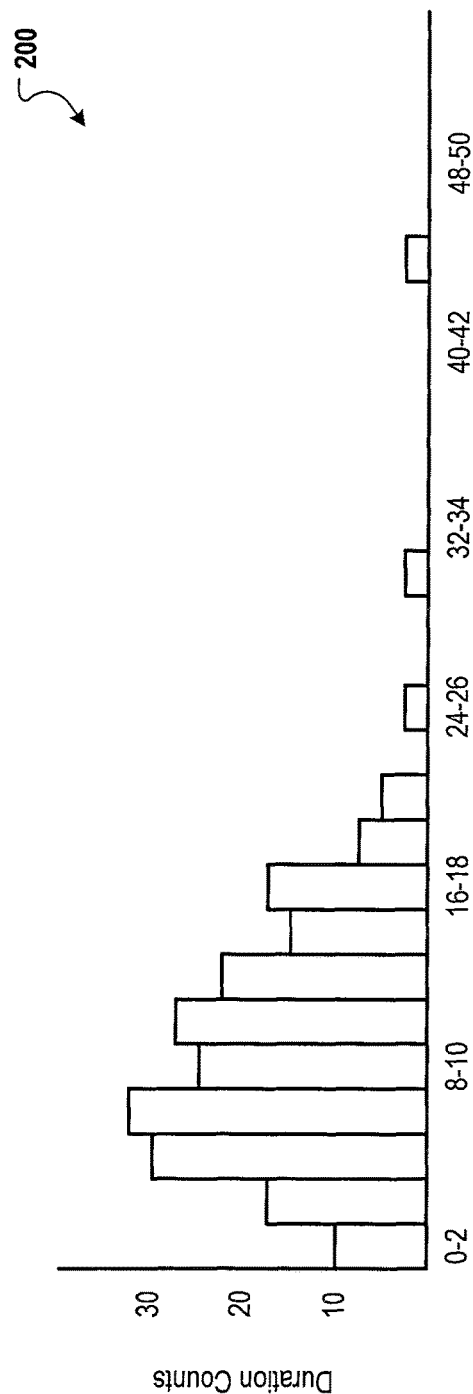
FIG. 2 is a graph showing a representation of an example distribution of presentation durations for an application link.

The link classification server(s) 114 can determine a count of the number of presentation durations assigned to each duration group. The counts for each duration group defines a distribution of presentation durations for the application link. In particular, the distribution for an application link specifies, for each of a set of duration groups, the number of presentation durations for the application link assigned to the duration group. An example distribution for an application link is illustrated in FIG. 2 and described below. The machine learning model 116 can be applied to the counts of each duration group for the application link and can classify the application link based on the counts. For example, the link classification server(s) 114 may generate a feature vector that includes a vector element for each duration group. The value of each vector element may be equal to (or proportional to) the count of the number of presentation durations for the application link assigned to the duration group that corresponds to the vector element. For example, the feature vector may include a vector element that corresponds to the 6-9 seconds duration group. The value of this vector element may be the number of presentation durations for the application link that were between 6 and 9 seconds. The link classification server(s) may apply the machine learning model 116 to the feature vector generated for the application link to classify the application link as broken or working.

By classifying the application link based on a distribution of presentation durations, the machine learning model 116 can take into account patterns of presentation durations over multiple requests for the application by multiple different client devices 142. For example, broken application links may result in a large number of presentation durations assigned to the duration groups that have short durations while having significantly fewer presentation durations assigned to the duration groups that have longer durations. In contrast, a working application link may have a significant number (e.g., more than a threshold number) of presentation durations assigned to many different duration groups, including those having longer durations. The machine learning model 116 can be trained to identify various different distribution patterns that correspond to broken application links and various different distribution patterns that correspond to working application links, as described in more detail below.

The machine learning model 116 can classify groups of application links in a similar manner as individual application links. For example, the link classification server(s) 114 can identify, for each application link included in an application link group, the presentation durations for the application link and aggregate the presentation durations for the group. The link classification server(s) 114 can then apply the machine learning model 116 to the presentation durations for the group of application links and output a classification of whether the application links in the group, as a whole, are broken. For example, a classification of broken for the group may indicate that each application link in the group is broken. In response, the classification server(s) 114 may generate an alert that specifies that the application links in the group may be broken and transmit the alert to the front-end server(s) 112. In turn, the front-end server(s) 112 may transmit the alert to a client device of a system administrator, who may further investigate the application links in the group.

To classify a group of application links, the link classification server(s) 114 may generate a distribution of the presentation durations for the application links in the group and apply the machine learning model to the distribution. For example, the link classification server(s) 114 may generate a feature vector for the group in a similar manner as the feature vector for an individual application link. The link classification server(s) 114 may generate a feature vector that includes a vector element for each duration group in a set of duration groups. The value of each vector element may be equal to (or proportional to) the count of the number of presentation durations for the group of application links assigned to the duration group that corresponds to the vector element. For example, the feature vector may include a vector element that corresponds to the 1-3 seconds duration group. The value of this vector element may be the total number of presentation durations for the group that were between 1 and 3 seconds. To illustrate, a group may have as members two application links. One of the two application links may have had ten presentation durations that were between 1 and 3 seconds and the other application link may have had five presentation durations that were between 1 and 3 seconds. In this example, the vector element that corresponds to the 1-3 seconds duration group may have a value of 15. The link classification server(s) may apply the machine learning model 116 to the feature vector generated for the group of application links to classify the application links in the group as broken or working.

The link classification server(s) 114 can assign a set of application links to groups based on one or more characteristics of the application links and/or one or more characteristics of the applications or application content to which the application links point. The link classification server(s) 114 can store data identifying the groups and each group's members in a link groups database 120. In some implementations, the link classification server(s) 114 can assign application links to groups based on strings of characters included in the application links. As described above, the application links can be grouped based on the prefix patterns of the application links. In this example, the link classification server(s) 114 can identify strings of characters found in one or more of the application links for which to generate a group. In a particular example, the link classification server(s) 114 may identify strings of characters that are common to (e.g., the same in) two or more of the application links and generate a group for the application link prefix pattern defined by the common string of characters.

In some implementations, the application link prefix patterns are based on strings of characters starting at the beginning of the strings of characters of the application links. For example, the string of characters of a first application link may be "appname:itemcategory1/item1" and the string of characters of a second application link may be "appname:itemcategory1/item2." In this example, the link classification server(s) 114 may evaluate the string of characters from left to right and determine that the two application links have a common prefix of "appname:itemcategory1/." In response, the link classification server(s) 114 may generate a group for the application link prefix pattern "appname:itemcategory1/" and include, in the group, each application link that has a string of characters that starts with the application link prefix pattern.

The link classification server(s) 114 may generate groups based on the number of application links and/or the number of presentation durations available for each potential group. For example, the link classification server(s) 114 may identify strings of characters that are common to two or more application links. For each identified string of characters, the link classification server(s) 114 may identify the number of application links that include the string of characters. The link classification server(s) 114 may then generate a group for each string of characters for which at least a threshold number of application links includes the string of characters. In another example, the link classification server(s) 114 may rank the string of characters based on the number of application links that include the string of characters and generate a group for the top N string of characters, where "N" is a specified number (e.g., specified by an administrator of the broken link detection system and obtainable from a data store or digital memory device). For each group, the link classification server(s) 114 can populate the group with the application links that include the string of characters for which the group was generated.

Similarly, the link classification server(s) 114 may identify strings of characters that are common to (e.g., the same in) two or more different application links. For each identified string of characters, the link classification server(s) 114 may identify the total number of presentation durations stored in the presentation durations database 118 for the application links that include the string of characters. If the link classification server(s) 114 uses the machine learning model 116 to classify application links based on presentation durations for a particular time period (e.g., the previous day), the link classification server(s) may identify the total number of presentation durations for the application links that include the string of characters and for which the presentation duration occurred at least partially within the particular time period. For example, a presentation duration may partially occur within the particular time period if the presentation of the application content was initiated within the particular time period, but lasted until after the particular time period ended. The link classification server(s) 114 may generate a group for each string of characters for which at least a threshold number of presentation durations are available for application links that include the string of characters. In another example, the link classification server(s) 114 may rank the string of characters based on the number of presentation durations available and generate a group for the top N string of characters, where "N" is a specified number. For each group, the link classification server(s) 114 can populate the group with the application links that include the string of characters for which the group was generated.

The link classification server(s) 114 may also generate groups for particular applications. For example, the link classification server(s) may create a group for each particular application and include, in the group for a particular application, each application link that points to the application or a particular location within the particular application.

The link classification server(s) 114 can also classify application links and/or groups of applications based on changes in presentation durations over time. For example, if the presentation durations for an application link have decreased significantly (e.g., by at least a threshold amount), the application link may have become broken. To classify an application link, the link classification server(s) 114 can determine an average presentation duration for the application link for each day (or another appropriate time period) over a particular time period, e.g., the previous week. The application server(s) can also determine the average presentation duration for the application link for the current day (or other appropriate time period). The link classification server(s) 114 can then compare the average presentation duration for the current day to the average presentation durations for the previous days (or a combined average for all the previous days under consideration). If the average presentation duration for the current day is at least a threshold amount less than the average presentation duration(s) for the previous days, the link classification server(s) 114 may classify the application link as a broken link.

In some implementations, the link classification server(s) 114 may not classify an application link if the standard deviation of the average presentation durations for the previous days exceeds a threshold. For example, a high standard deviation (e.g., one that exceeds the threshold) may indicate that the data is not sufficiently stable to be used to classify the application link, thereby preventing the link classification servers 114 from outputting erroneous classifications.

FIG. 2 is a graph 200 showing a representation of an example distribution of presentation durations for an application link. The graph 200 illustrates presentation duration groups and, for each duration group, a count of the number of presentation durations assigned to each duration group. In this example, the duration groups are each for a two second duration range. For example, the first duration group is for the duration range of 0-2 seconds and the first duration group has been assigned ten presentation durations. That is, content of an application linked to by the application link was viewed ten times for a duration between 0-2 seconds. In some implementations, the distribution may be based on the percentage of presentation durations assigned to each duration group rather than the count of the number of presentation durations assigned to each duration group.

A machine learning model can be applied to the distribution to predict (e.g., determine) whether the application link is working or broken. This example distribution may represent the presentation durations for a broken link as most of the presentation durations are less than twenty seconds and there are few presentation durations that were greater than thirty seconds. Thus, the machine learning model may output a classification of broken for this example distribution.

Figure 3:
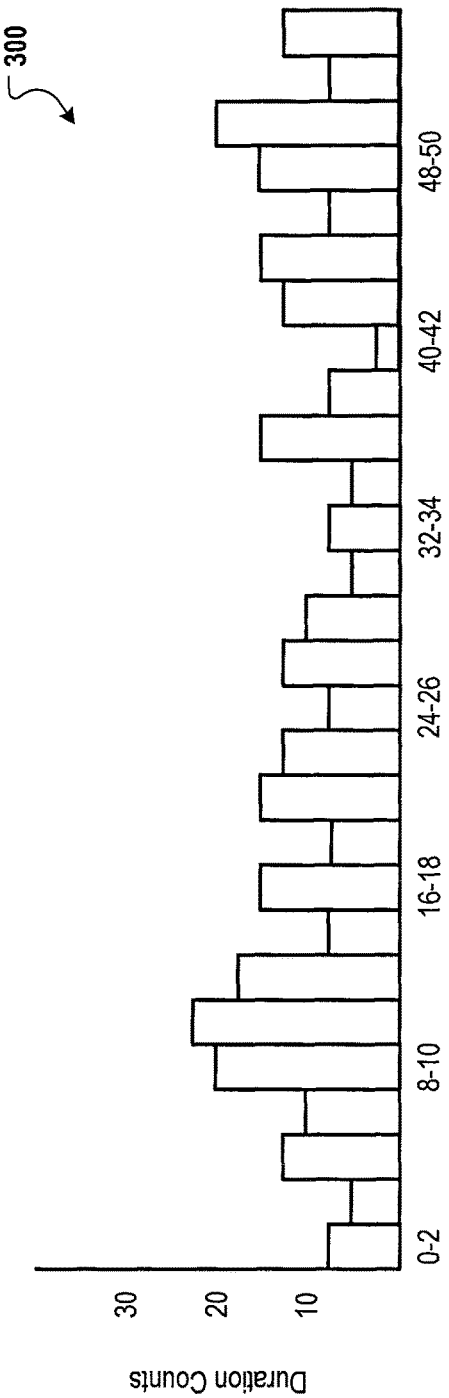
FIG. 3 is a graph showing a representation of an example distribution of presentation durations for an application link.

FIG. 3 is a graph 300 showing a representation of an example distribution of presentation durations for an application link. Similar to the graph 200 of FIG. 2, the graph 300 illustrates presentation duration groups and, for each duration group, a count of the number of presentation durations assigned to each duration group. A machine learning model can be applied to the distribution to predict (e.g., determine) whether the application link is working or broken. This example distribution may represent the presentation durations for a working link as the presentation durations are distributed over the range of durations and is not highly weighted towards short presentation durations. Thus, the machine learning model may output a classification of working for this example distribution.

FIG. 4 is a flow chart of an example process 400 for training a machine learning model to predict whether application links are broken links. Operations of the process 400 can be implemented, for example, by a system that includes one or more data processing apparatus, such as the broken link detection system 110 of FIG. 1. The process 400 can also be implemented by instructions stored on computer storage medium, where execution of the instructions by a system that includes a data processing apparatus cause the data processing apparatus to perform the operations of the process 400.

The system identifies a set of training application links (402). For example, the system may access a database or index that includes data identifying training application links and labeled training data for each training application link. The training application links can be application links for which labeled training data are available. For example, the training application links may be application links for which the operational status (e.g., working or broken) is known and for which there is at least a threshold number of actual presentation durations available for use in training the machine learning model. The training application links can be identified such that the set includes at least a threshold number of working application links and at least a threshold number of broken application links.

The system obtains labeled training data for each training application link (404). For example, the system may access the database, identify labeled training data that is indexed to each training application link, and retrieve the labeled training data for the training application links. The labeled training data for each training application link can include a set of presentation durations for the training application link and a label. The label for a training application link can specify whether the training application link is broken or working. For example, the label for an application link can specify whether the training application link is broken or working based on whether a user interaction with the training application link caused a device to navigate to content pointed to by the training application link.

In some implementations, one or more system administrators and/or one or more users test the training application links and update the labels accordingly. For example, a system administrator may interact with (e.g., select) a training application link and monitor to see whether the content linked to by the training application link was presented. If the correct content was presented following interaction with the training application link, the system administrator may update the label for the training application link to indicate that the training application link is working. If the application linked to by the training application link did not open or the content linked to by the training application link was not presented following interaction with the training application link, the system administrator may update the label to indicate that the training application link is broken. In another example, users that interact with a training application link was be prompted, e.g., automatically using a user interface element, to select whether the training application worked or is broken.

The system trains a machine learning model to predict whether an application link is working or broken using the training data (406). In some implementations, the system may generate the machine learning model by partitioning a portion of the training application links and the corresponding presentation durations and labels into a training set and a testing set. The machine learning model may then be trained using the presentation durations of each training application link in the training set and the labels for each training application link in the training set. In some implementations, the machine learning model may include one or more weights associated with particular features of the presentation durations, e.g., weights for each duration group, weights for the magnitudes of presentation durations, and/or weights for the relative number of presentation durations that are in each duration group. Training the predictive model may include adjusting the weights associated with the features and feature combinations that are found to be predictive of whether an application link is broken or working. Various methods and techniques for correlating the features and the labels may be used, such as clustering, linear regression, logistic regression, and non-linear regression.

After training the predictive model, the model may then be tested using the presentation durations of the training application links in the testing set or in another training set. The weights associated with each feature in the machine learning model may then be adjusted based on the results of the testing.

Figure 5:
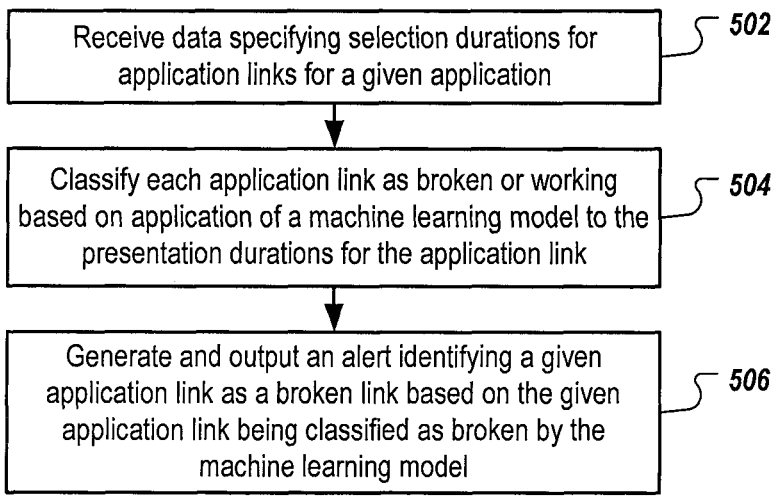
FIG. 5 is a flow chart of an example process for identifying broken application links.

FIG. 5 is a flow chart of an example process 500 for identifying broken application links. Operations of the process 500 can be implemented, for example, by a system that includes one or more data processing apparatus, such as the broken link detection system 110 of FIG. 1. The process 500 can also be implemented by instructions stored on computer storage medium, where execution of the instructions by a system that includes a data processing apparatus cause the data processing apparatus to perform the operations of the process 500.

The system receives data specifying presentation durations for one or more applications links for a given application (502). Each of the one or more application links may link to a particular location within, or particular content of, the given application. Each presentation duration may specify how long application content linked to by the application link was presented following user interaction with the application link.

The data can include presentation durations for multiple different user interactions with each of the one or more application links. For example, each application link may receive interactions from multiple different users. In response to each interaction, application content linked to by the application link may be presented to the user who interacted with the application link. For each user interaction, the system can monitor the duration for which the application content was presented following the user interaction and record the duration as a presentation duration for the application link.

If an application link is broken, content of the application may not be presented to the user, or incorrect content may be presented to the user. If the application crashes, the presentation duration may specify the amount of time between user interaction with the application and the application crashing. If the application does not open, the presentation duration may be zero. If incorrect content is presented, the presentation duration may be short (e.g., less than a threshold duration) as the user may navigate away from the incorrect content or close the application.

The system classifies each application link as broken or working based on application of a machine learning model to the presentation durations for the application link (504). For example, the system may identify a machine learning model that has been trained to predict whether an application link is working or broken based on the presentation durations observed for the application link. The machine learning model may be trained, for example, using the example process 400 illustrated in FIG. 4 and described above.

In some implementations, the machine learning model predicts whether an application link is working or broken based on a distribution of the presentation durations. For example, the system may assign each presentation duration to a duration group that has a range of durations in which the presentation duration falls. The system can determine a count of the number of presentation durations assigned to each duration group. The counts for each duration group defines a distribution of presentation durations for the application link. The machine learning model can be applied to the counts for each duration group and the machine learning model can output, based on the counts, a classification of working or broken for the application link.

In some implementations, the machine learning model can be applied to a feature vector for the application link. In this example, the feature vector can include a vector element for each duration group. The value of each vector element may be equal to (or proportional to) the count of the number of presentation durations for the application link assigned to the duration group that corresponds to the vector element.

The system generates and outputs an alert for each application link that is classified as a broken link by the machine learning model (506). The alert for a given application link may identify the given application link as a broken link based on the given application link being classified as broken by the machine learning model. The system may transmit the alert to a client device of a system administrator. In response, the system administrator may further investigate the application link. If the system administrator determines that the application link is broken, the system administrator may remove the broken link from one or more electronic resources that include the link and/or repair the link.

Figure 6:
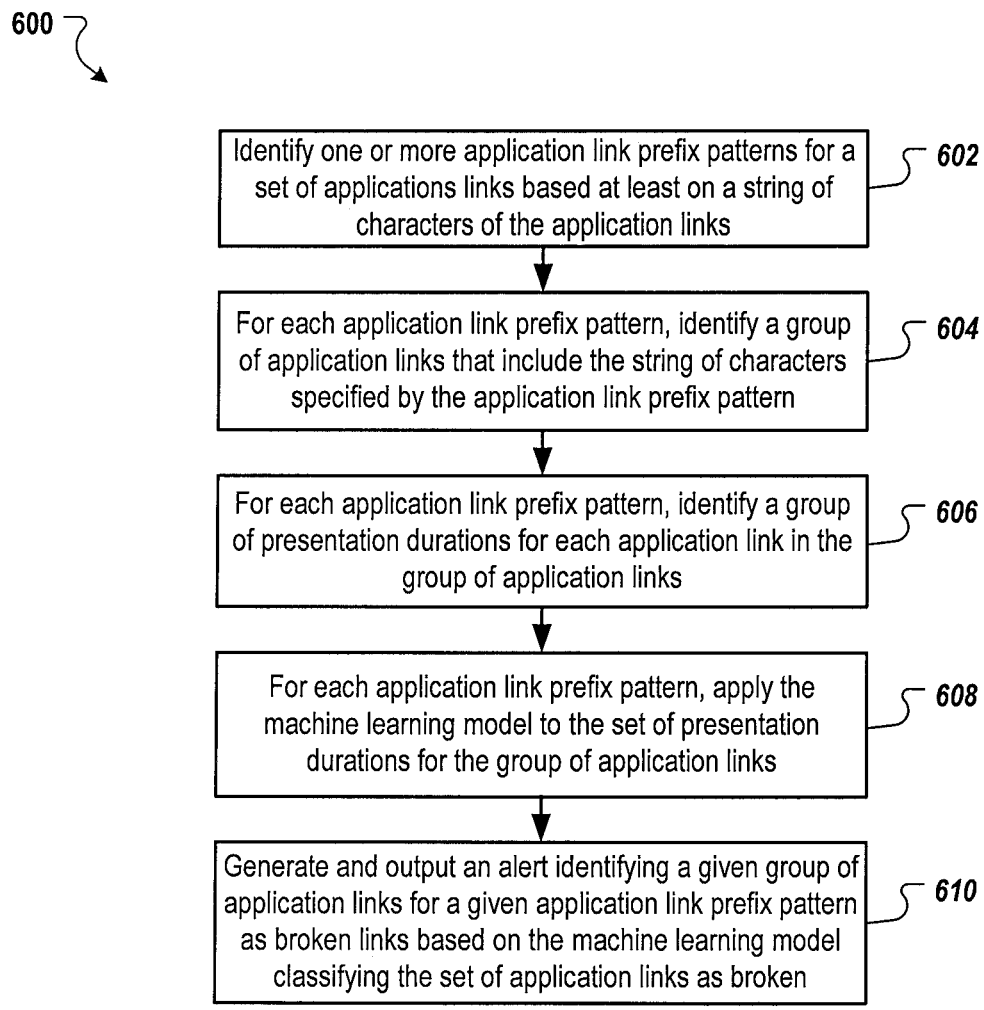
FIG. 6 is a flow chart of an example process for identifying application link prefix patterns of broken application links.

FIG. 6 is a flow chart of an example process 600 for identifying application link prefix patterns of broken application links. Operations of the process 600 can be implemented, for example, by a system that includes one or more data processing apparatus, such as the broken link detection system 110 of FIG. 1. The process 600 can also be implemented by instructions stored on computer storage medium, where execution of the instructions by a system that includes a data processing apparatus cause the data processing apparatus to perform the operations of the process 600.

The system identifies one or more application link prefix patterns for a set of applications links based at least on a string of characters of the application links (602). For example, as described above, each application link can include a string of characters for identifying a particular location within a particular application. The system may identify strings of characters that are common to two or more of the application links and generate a group for the application link prefix pattern defined by the common string of characters. As described above, application link groups may be generated based on the number of application links and/or the number of presentation durations available for each potential group.

For each application link prefix pattern, identify a group of application links that include the string of characters specified by the application link prefix pattern (604). For example, the system may compare the string of characters specified by the application link prefix pattern to the string of characters of each application link. Each application link that includes a set of characters that matches the string of characters specified by the application link prefix pattern may be included in an application link group for the application link prefix pattern. For example, a first string of characters may be considered to match a second string of characters if both string of characters are the same or have at least a specified similarity. The similarity between strings of characters may be based on the number of characters (or the percentage of characters) in the strings of characters that are the same and that are in the same position within the strings of characters. In some implementations, the system only includes in an application link group for an application link prefix pattern those application links that have a string of characters that begin with the string of characters specified by the application link prefix pattern, For each application link prefix pattern, the system identifies a set of presentation durations for each application link in the group of application links (606). For example, each application link may have a set of presentation durations. The system may aggregate the presentation durations for the group into a set of presentation durations.

For each application link prefix pattern, the system applies the machine learning model to the set of presentation durations for the group of application links (608). The system may apply the machine learning model to the set of presentation durations in the same, or a similar manner, as described above with reference to FIG. 5. For example, the system may assign each presentation duration in the set of presentation durations to a duration group that has a range of durations in which the presentation duration falls. The system can determine a count of the number of presentation durations of the set of presentation durations assigned to each duration group. The system can apply the machine learning model to the counts for each duration group and the machine learning model can output, based on the counts, a classification of working or broken for the application link.

In some implementations, the machine learning model can be applied to a feature vector for the application link group. In this example, the feature vector can include a vector element for each duration group. The value of each vector element may be equal to (or proportional to) the count of the number of presentation durations for the application link group assigned to the duration group that corresponds to the vector element.

The system generates and outputs an alert identifying a given group of application links for a given application link prefix pattern as broken links based on the machine learning model classifying the set of application links as broken (610). For example, the machine learning model may output a classification of working or broken for each application link group. For those having a classification of broken, the system can generate an alert that identifies the application links in the application groups as broken links. The system may transmit the alert to a client device of a system administrator who may further investigate and repair or remove any broken links.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    one or more front-end servers that receive data specifying, for multiple different user interactions with one or more application links that link to a given application, presentation durations specifying how long application content linked to by the one or more application links was presented following the multiple different user interactions with the one or more application links;
    one or more hardware storage devices that store the data specifying the presentation durations; and
    one or more back-end servers that communicate with the one or more front end servers and perform operations including:
        classifying each application link as broken or working based on application of a machine learning model to the presentation durations for the application link, wherein:
            the machine learning model is generated using labeled training data that includes, for each training application link in a set of training application links:
                a set of presentation durations for the training application link; and
                a label that specifies whether the training application link is broken or working based on whether a user interaction with the training application link resulted in successful presentation of content pointed to by the training application link; and
            the machine learning model classifies an application link as broken or working based on a distribution of the presentation durations for the application link, wherein the distribution of the presentation durations defines how many presentation durations are within each of a plurality of time duration ranges; and
        generating and outputting an alert identifying a given application link as a broken link based on the given application link being classified as broken by the machine learning model.

2. The system of claim 1, wherein the machine learning model classifies an application link by:
    assigning each presentation duration for the application link to a duration group of a set of duration groups based on duration, each duration group being for a range of durations and including the presentation durations for the application link that are within the range of durations for the duration group; and
    classifying the application link as broken or working based on a pattern defined by a number of presentation durations assigned to each duration group.

3. The system of claim 1, wherein the operations comprise:
    identifying a set of application links including the one or more application links that that link to a given application;
    grouping the application links into a set of application link groups based on characteristics of the application links in the set of application links; and
    classifying each application link group as having broken or working links based on application of the machine learning model to presentation durations for the application links in the application link group.

4. The system of claim 1, wherein:
    each application link includes a string of characters for identifying a particular location within a particular application; and
    the operations include:
        identifying one or more application link prefix patterns for a set of applications links that includes the one or more application links based at least on the string of characters of the application links, each application link prefix pattern specifying a string of characters common to two or more application links;
        for each application link prefix pattern:
            identifying a group of application links that include the string of characters specified by the application link prefix pattern;
            identifying a set of presentation durations for each application link in the group of application links;
            applying the machine learning model to the presentation durations for the group of application links; and
            generating and outputting an alert identifying a given group of application links for a given application link prefix pattern as broken links based on the machine learning model classifying the set of application links as broken.

5. The system of claim 4, wherein the operations include identifying the one or more application link prefix patterns based on a number of presentation durations available for each application link prefix pattern.

6. The system of claim 1, wherein the machine learning model comprises a linear regression model.

7. The system of claim 1, wherein the presentation duration is measured from a time at which user interaction with the application link occurred to a time at which the application is closed or the application navigates to other content or the application crashed.

8. A method performed by data processing apparatus, the method comprising:
receiving data specifying, for multiple different user interactions with one or more application links that link to a given application, presentation durations specifying how long application content linked to by the one or more application links was presented following the multiple different user interactions with the one or more application links;
classifying each application link as broken or working based on application of a machine learning model to the presentation durations for the application link, wherein:
the machine learning model is generated using labeled training data that includes, for each training application link in a set of training application links:
a set of presentation durations for the training application link; and
a label that specifies whether the training application link is broken or working based on whether a user interaction with the training application link resulted in successful presentation of content pointed to by the training application link; and
the machine learning model classifies an application link as broken or working based on a distribution of the presentation durations for the application link, wherein the distribution of the presentation durations defines how many presentation durations are within each of a plurality of time duration ranges; and
generating and outputting an alert identifying a given application link as a broken link based on the given application link being classified as broken by the machine learning model.

9. The method of claim 8, wherein the machine learning model classifies an application link by:
assigning each presentation duration for the application link to a duration group of a set of duration groups based on duration, each duration group being for a range of durations and including the presentation durations for the application link that are within the range of durations for the duration group; and
classifying the application link as broken or working based on a pattern defined by a number of presentation durations assigned to each duration group.

10. The method of claim 8, further comprising:
identifying a set of application links including the one or more application links that that link to a given application;
grouping the application links into a set of application link groups based on characteristics of the application links in the set of application links; and
classifying each application link group as having broken or working links based on application of the machine learning model to presentation durations for the application links in the application link group.

11. The method of claim 8, wherein each application link includes a string of characters for identifying a particular location within a particular application, the method further comprising:
identifying one or more application link prefix patterns for a set of applications links that includes the one or more application links based at least on the string of characters of the application links, each application link prefix pattern specifying a string of characters common to two or more application links;
for each application link prefix pattern:
identifying a group of application links that include the string of characters specified by the application link prefix pattern;
identifying a set of presentation durations for each application link in the group of application links;
applying the machine learning model to the presentation durations for the group of application links; and
generating and outputting an alert identifying a given group of application links for a given application link prefix pattern as broken links based on the machine learning model classifying the set of application links as broken.

12. The method of claim 11, further comprising identifying the one or more application link prefix patterns based on a number of presentation durations available for each application link prefix pattern.

13. The method of claim 8, wherein the machine learning model comprises a linear regression model.

14. A non-transitory computer storage medium encoded with a computer program, the program comprising instructions that when executed by data processing apparatus cause the data processing apparatus to perform operations comprising:
receiving data specifying, for multiple different user interactions with one or more application links that link to a given application, presentation durations specifying how long application content linked to by the one or more application links was presented following the multiple different user interactions with the one or more application links;
classifying each application link as broken or working based on application of a machine learning model to the presentation durations for the application link, wherein:
the machine learning model is generated using labeled training data that includes, for each training application link in a set of training application links:
a set of presentation durations for the training application link; and
a label that specifies whether the training application link is broken or working based on whether a user interaction with the training application link resulted in successful presentation of content pointed to by the training application link; and
the machine learning model classifies an application link as broken or working based on a distribution of the presentation durations for the application link, wherein the distribution of the presentation durations defines how many presentation durations are within each of a plurality of time duration ranges; and
generating and outputting an alert identifying a given application link as a broken link based on the given application link being classified as broken by the machine learning model.

15. The non-transitory computer storage medium of claim 14, wherein the machine learning model classifies an application link by:
assigning each presentation duration for the application link to a duration group of a set of duration groups based on duration, each duration group being for a range of durations and including the presentation durations for the application link that are within the range of durations for the duration group; and
classifying the application link as broken or working based on a pattern defined by a number of presentation durations assigned to each duration group.

16. The non-transitory computer storage medium of claim 14, wherein the operations comprise:
- identifying a set of application links including the one or more application links that that link to a given application;
- grouping the application links into a set of application link groups based on characteristics of the application links in the set of application links; and
- classifying each application link group as having broken or working links based on application of the machine learning model to presentation durations for the application links in the application link group.

17. The non-transitory computer storage medium of claim 14, wherein:
- each application link includes a string of characters for identifying a particular location within a particular application; and
- the operations include:
  - identifying one or more application link prefix patterns for a set of applications links that includes the one or more application links based at least on the string of characters of the application links, each application link prefix pattern specifying a string of characters common to two or more application links;
  - for each application link prefix pattern:
    - identifying a group of application links that include the string of characters specified by the application link prefix pattern;
    - identifying a set of presentation durations for each application link in the group of application links;
    - applying the machine learning model to the presentation durations for the group of application links; and
  - generating and outputting an alert identifying a given group of application links for a given application link prefix pattern as broken links based on the machine learning model classifying the set of application links as broken.

18. The non-transitory computer storage medium of claim 17, wherein the operations comprise identifying the one or more application link prefix patterns based on a number of presentation durations available for each application link prefix pattern.

* * * * *